United States Patent [19]

Teigen et al.

[11] Patent Number: 5,184,864
[45] Date of Patent: Feb. 9, 1993

[54] COUNTER-BALANCE DEVICE WITH STRAP FOR ARTICULATED DOORS

[75] Inventors: Jerry T. Teigen, New Richmond, Wis.; Paul A. Villella, St. Paul, Minn.

[73] Assignee: Dorso Trailer Sales Inc., St. Paul, Minn.

[21] Appl. No.: 766,368

[22] Filed: Sep. 25, 1991

Related U.S. Application Data

[63] Continuation-in-part of Ser. No. 675,657, Mar. 27, 1991.

[51] Int. Cl.⁵ .................................. B60P 3/00; B60J 5/06
[52] U.S. Cl. ............................ 296/24.1; 160/191; 242/107; 254/364; 296/155
[58] Field of Search ............... 296/24.1, 98, 100, 155; 160/133, 190, 191, 192, 193, 201, 232, 235, 236; 242/107; 254/364

[56] References Cited

U.S. PATENT DOCUMENTS

| | | | |
|---|---|---|---|
| 1,936,300 | 11/1933 | Guss | 160/133 |
| 2,951,533 | 9/1960 | Lucas et al. | 160/40 |
| 3,056,451 | 10/1962 | Federline et al. | 160/201 |
| 3,078,917 | 2/1963 | Recchione | 160/40 X |
| 3,129,752 | 4/1964 | Whiting | 160/201 |
| 3,135,544 | 6/1964 | Mickey et al. | 296/24.1 |
| 3,148,724 | 9/1964 | Chieger et al. | 160/40 |
| 3,424,222 | 1/1969 | Stoner et al. | 160/40 |
| 3,850,465 | 11/1974 | Hill et al. | 292/231 |
| 3,894,571 | 7/1975 | Hinchliff | 160/201 |
| 3,910,625 | 10/1975 | Menard | 242/107 X |
| 4,114,945 | 9/1978 | Lutz | 16/93 R |
| 4,219,067 | 8/1980 | Hurst | 160/133 |
| 4,343,340 | 8/1982 | Paule | 160/236 X |
| 4,601,953 | 7/1986 | Haffer | 160/133 X |
| 4,611,848 | 9/1986 | Romano | 296/98 |
| 4,747,441 | 5/1988 | Apolzer et al. | 296/100 X |
| 4,785,494 | 11/1988 | Adamski | 296/155 X |
| 4,786,099 | 11/1988 | Mount | 296/98 |
| 4,800,619 | 1/1989 | Hudak | 160/201 X |
| 4,842,458 | 6/1989 | Carpenter | 242/107 X |
| 4,889,381 | 12/1989 | Tamblyn et al. | 296/98 |
| 4,924,932 | 5/1990 | Esnault | 160/232 X |

FOREIGN PATENT DOCUMENTS

| | | | |
|---|---|---|---|
| 2507240 | 9/1976 | Fed. Rep. of Germany | 160/133 |
| 2056 | 3/1990 | PCT Int'l Appl. | 296/98 |
| 181711 | 11/1962 | Sweden | 160/201 |

*Primary Examiner*—Charles A. Marmor
*Assistant Examiner*—Andrew C. Pike
*Attorney, Agent, or Firm*—Kinney & Lange

[57] ABSTRACT

An articulated door and door guiding track covers storage bays of a beverage body. An articulated door is formed by engaging a plurality of polymeric panel sections into a sequence such that each panel section can be positioned at varying angles with respect to an adjacent engaged panel section. The articulated door is guided between an open position and a closed position by a door guiding track comprised of a left channel facing a right channel across a door opening. The sequence of panel sections is slidably positioned in the door guiding track by having a left end of each panel section extending into the left channel and a right end of each panel section extending into the right channel. A counter-balance comprised of a spring-loaded drum having a strap with one end attached to the bottom of the door and another end attached to the center of the drum is provided to assist in raising and lowering the door. As the door is opened the strap rolls up around itself and continually applied a symmetric force to the door.

12 Claims, 9 Drawing Sheets

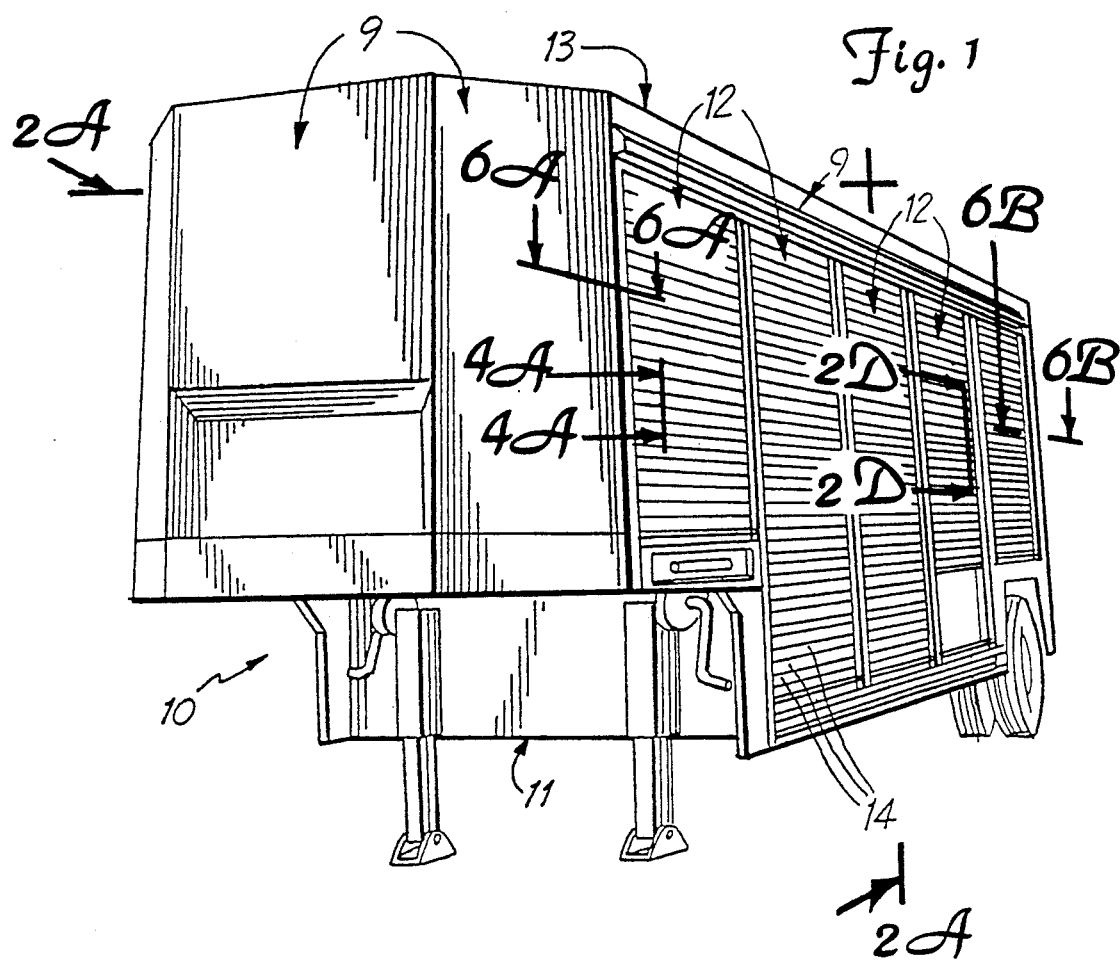

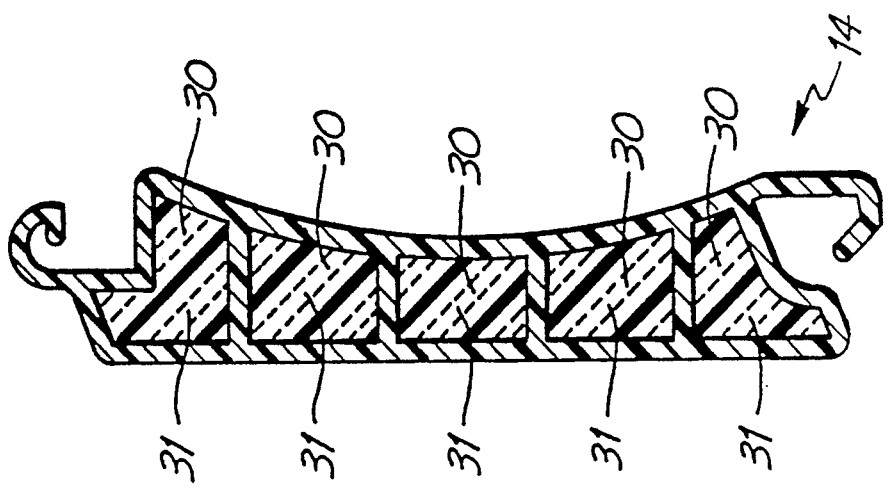
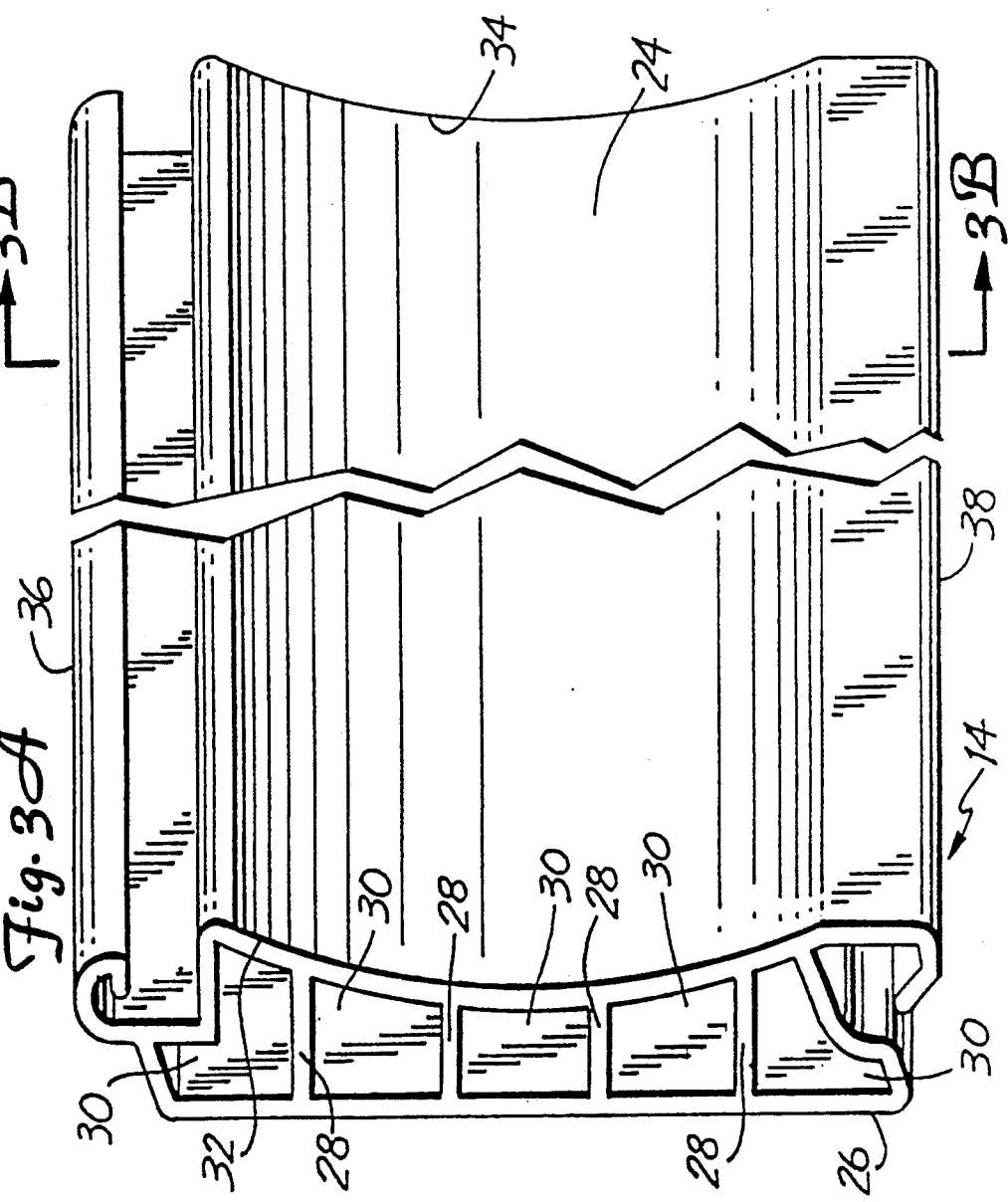

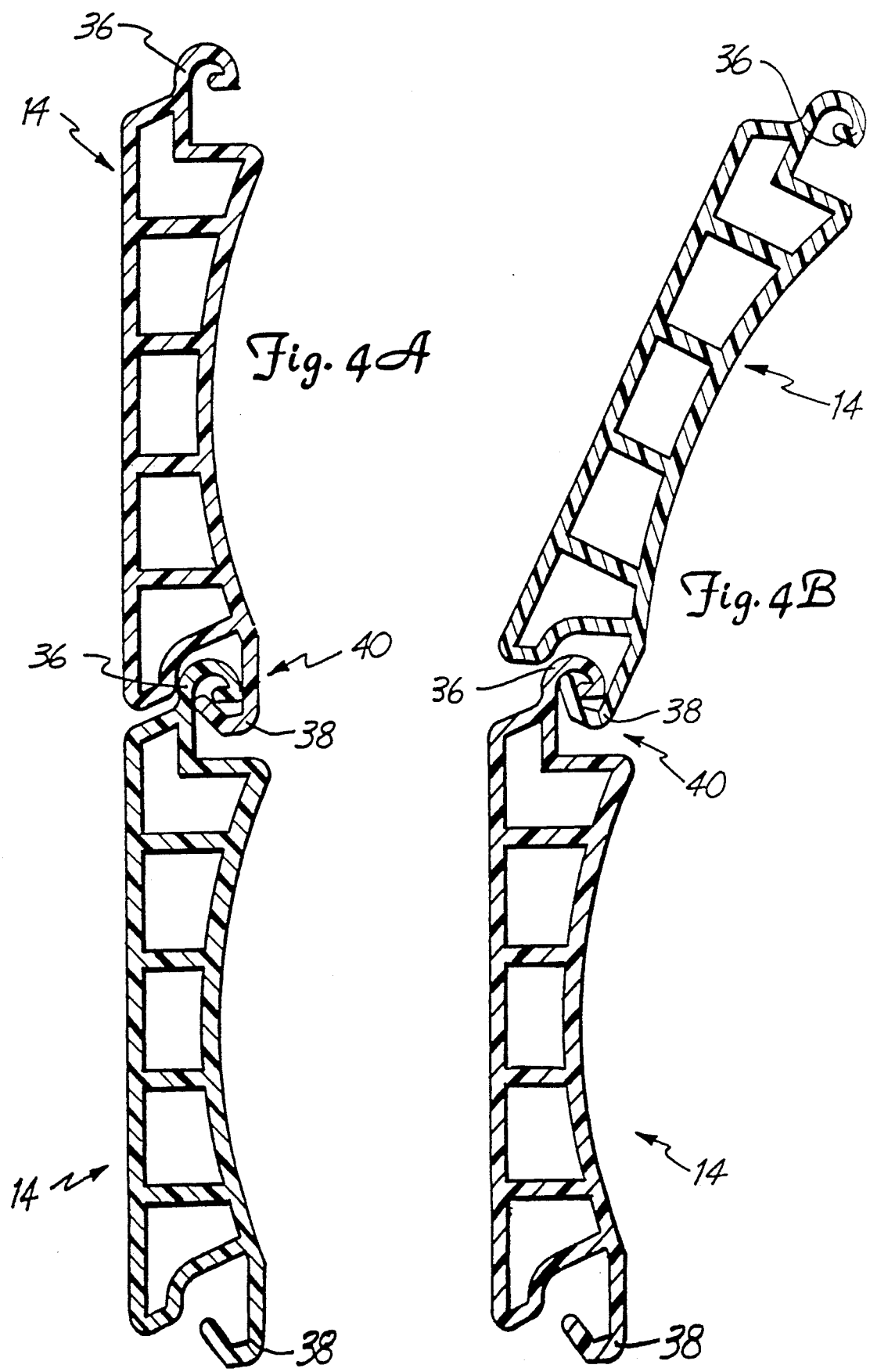

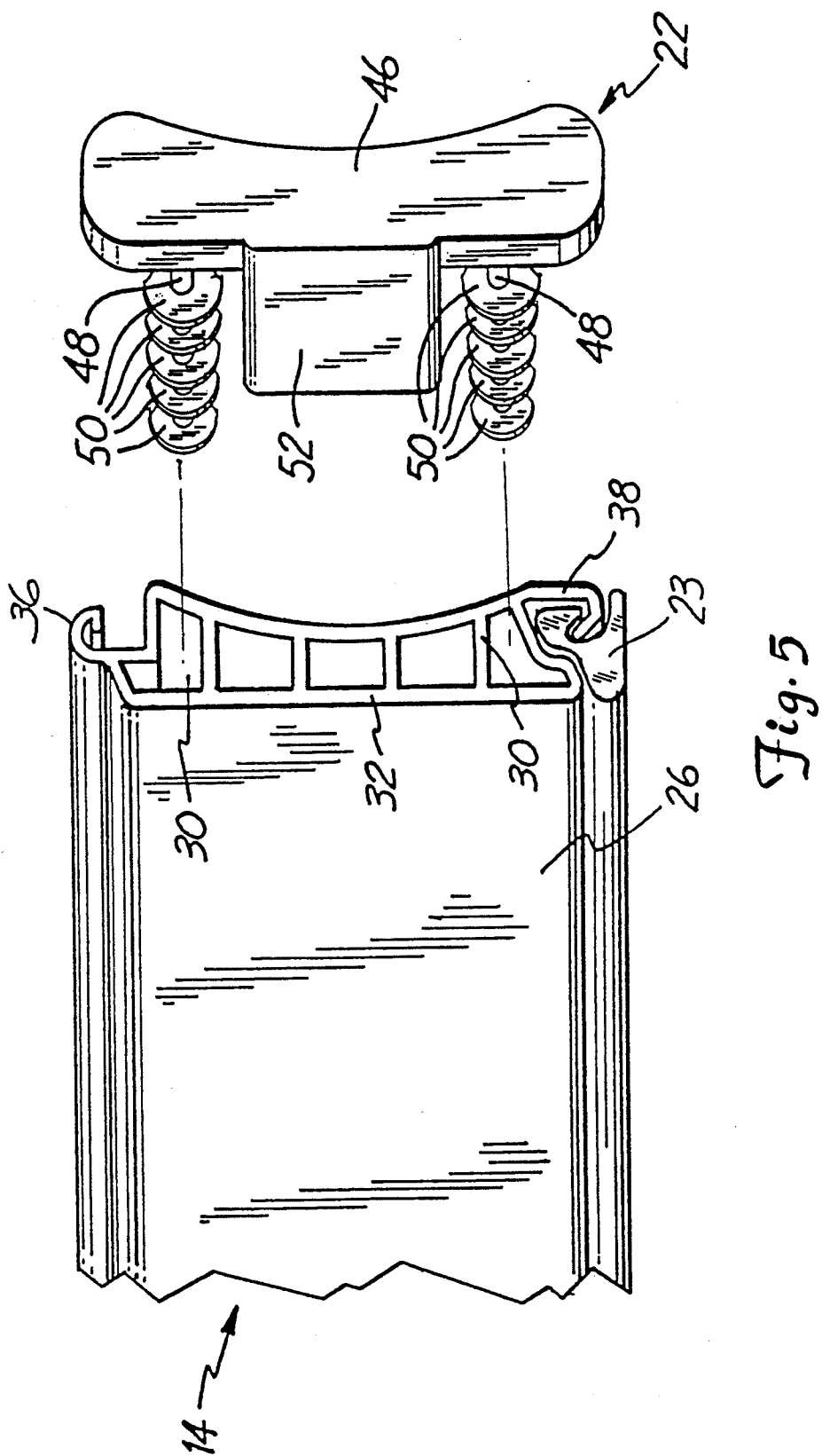

COUNTER-BALANCE DEVICE WITH STRAP FOR ARTICULATED DOORS

CROSS REFERENCE TO RELATED APPLICATION

This Application is a Continuation-in-Part of application Ser. No. 07/675,657, filed Mar. 27, 1991.

BACKGROUND OF THE INVENTION

The present invention relates to counterbalances devices used with articulated doors. More specifically, the present invention relates to a counter-balance for use in an articulated door wherein the counter-balance has a strap that rolls up upon itself as the door is opened.

Beverage trailers and trucks having beverage bodies have long been used to deliver beverages to various sorts of retailers. Articulated doors are typically used on both sides of a beverage body to permit access to individual storage bays where the beverages are stored. Under normal use, these doors are opened many times during the day as the driver delivers beverages to retailers along his route. While a general purpose delivery truck may use one roll-up door at the rear of the truck, a typical beverage body may use ten or more doors. Therefore, any disadvantage associated with a particular door design is multiplied many times when that design is employed in a beverage body.

Beverage bodies have typically employed articulated doors that are formed from a sequence of solid aluminum panel sections. These panel sections are formed with interlockable edges. Usually an aluminum panel section will have a first interlockable edge with an attached cylindrical structure and a second interlockable edge opposite the first edge with an attached cylindrical structure having a radius larger than the radius of the cylindrical structure attached to the first edge. The smaller cylindrical structure of a panel section is placed within the larger cylindrical structure of an adjacent panel section thereby forming a joint that allows the two adjacent panel sections to be positioned at varying angles with respect to each other. The smaller cylindrical structure also includes a hollow center in which rollers are inserted. Therefore, every joint typically has a corresponding pair of rollers.

To guide an articulated aluminum door between an open position and a closed position, a door guiding track is required. A typical door guiding track is comprised of a pair of channels, with each channel having a pair of channel members facing each other across a gap in which the rollers are inserted. These channel members also may include track liners, often formed of stainless steel, to absorb vibrational energy and to reduce friction between the rollers and the channel members.

There are several problems that arise from using this type of articulated aluminum door in a beverage body. When doors of this type are new they typically work fine. However, as the beverage body is used, the door frame can be deformed by backing into loading docks and driving over rough roads and curbs. When the door frame is deformed, the door guiding track becomes out of square and the door will either jam or become very difficult to raise and lower.

As the beverage body is transported over roads with the articulated doors closed, the doors vibrate in their tracks. This vibrational energy is absorbed by the rollers and channel members as they vibrate against each other. This forms flat spots on the rollers and indentations in the channel members at the points where the rollers contact the channel members. As these indentations grow in size, the space surrounding the rollers increases, allowing the vibrations to increase in intensity and thereby increasing the rate at which the rollers and channel members deteriorate. These indentations also contribute to the door becoming more difficult to raise and lower.

As a door becomes more difficult to raise and lower, the rollers and channel members are lubricated. The lubrication eventually picks up dust and dirt which further accelerates the deterioration of the rollers and door guiding track. A delivery person will progressively exert more force to open and close the door as this deterioration cycle continues. Eventually a point will be reached when the delivery person will no longer be able to move the door. At this point the beverage body is brought back to the warehouse where typically a forklift is used to unjam the door, which usually destroys the door.

Because aluminum is not a resilient material, collisions with an articulated aluminum door usually result in a partial or complete destruction of the door. This can happen in a warehouse, where forklifts maneuver around and load beverage bodies, in an on-street accident, or from within the beverage body itself if the beverages contained therein should tip over. While the door can sometimes be repaired by replacing the impacted panel section, often adjacent panels will be deformed from the force transmitted through the interlocking edges.

When using beverage bodies in cold climates, the storage bays must be heated to prevent the beverages from freezing. Typically this is accomplished by circulating heated engine coolant from the tractor through the floor of the beverage body. Because aluminum is a highly thermo-conductive material, a layer of insulation must be added to the inner surface of an articulated aluminum door to retain the heat in the beverage body. This adds significant expense, complexity, and weight to articulated aluminum doors used in beverage bodies.

Another problem associated with the use of beverage bodies in cold climates results from the salt and sand that is applied to road surfaces to melt ice and improve traction. The salt and sand work their way into the joints that connect adjacent panel sections, where they corrode and wear down the aluminum surfaces that form the joint. While the door can be steam cleaned, the joint has usually been damaged by the time this is done. Eventually the joint will lock up and the affected panel sections must be replaced.

Because of the weight of an articulated aluminum door, a counter-balance device is typically used to assist the delivery person in opening and closing the door. This device is usually located above the storage bay and is generally comprised of a spring loaded drum that spans the width of the door opening. A cable has one end attached to the center of the drum and another end attached to the bottom of the door. As the door is moved from the closed position to the open position, the cable wraps around the drum in a single layer.

As the door is initially lifted from the closed position, the counter-balance pulls the door straight up. However, as the door continues to move toward the open position, the cable tends to move toward one side of the door opening as it wraps around the drum, thereby applying an asymmetric force to the door. This asymmetric force causes the door to wear excessively in two locations, the top corner of the door adjacent the side toward which the cable is moving and the bottom corner of the door adjacent the side opposite the side toward which the cable is moving.

SUMMARY OF THE INVENTION

The present invention provides an articulated door and door guiding track for use in beverage bodies. To form an articulated door, a plurality of panel sections are engaged in a sequence of panel sections such that each panel section can be positioned at varying angles with respect to an adjacent engaged panel section.

The articulated door is guided between an open position and a closed position by a door guiding track. The door guiding track is comprised of a left channel facing a right channel across a door opening. The sequence of panel sections are slidably positioned in the door guiding track with a left end of each panel section extending into the left channel and a right end of each panel section extending into the right channel.

A counter-balance comprised of a spring-loaded drum having a strap with one end attached to the bottom of the door and another end attached to the center of the drum is provided to assist in raising and lowering the door. As the door is opened the strap rolls up around itself and continually applies a symmetric force to the door.

The present invention provides an articulated door that is resilient, lightweight, wear resistant, corrosion resistant, self-lubricating, and has a high insulation value. The present invention does not employ rollers to guide the door between the open position and the closed position and is relatively tolerant of door frame misalignment.

BRIEF DESCRIPTION OF THE DRAWINGS

FIG. 1 is a perspective view of a beverage body having articulated doors, with each articulated door supported by a door guiding track, in accordance with the present invention.

FIG. 3A is a perspective view of a panel section, a plurality of which engaged in a sequence forms the articulated door of FIG. 1.

FIG. 3B is a transverse sectional view taken along line 3B—3B of FIG. 3A showing a panel section with a plurality of compartments which contain insulation.

FIG. 4A is a sectional view of a pair of adjacent engaged panel sections, taken along line 4A—4A of FIG. 1.

FIG. 4B shows the pair of adjacent engaged panel sections shown in FIG. 4A positioned at an angle with respect to each other, in accordance with the door of FIG. 1 being moved between an open position and a closed position.

FIG. 5 is a fragmentary perspective view of a panel section located at a bottom of the articulated door of FIG. 1; the panel section has a seal inserted into a bottom receptive edge and a slider plug (shown removed from a right end of the panel section).

DETAILED DESCRIPTION OF THE PREFERRED EMBODIMENTS

Figure 2A:
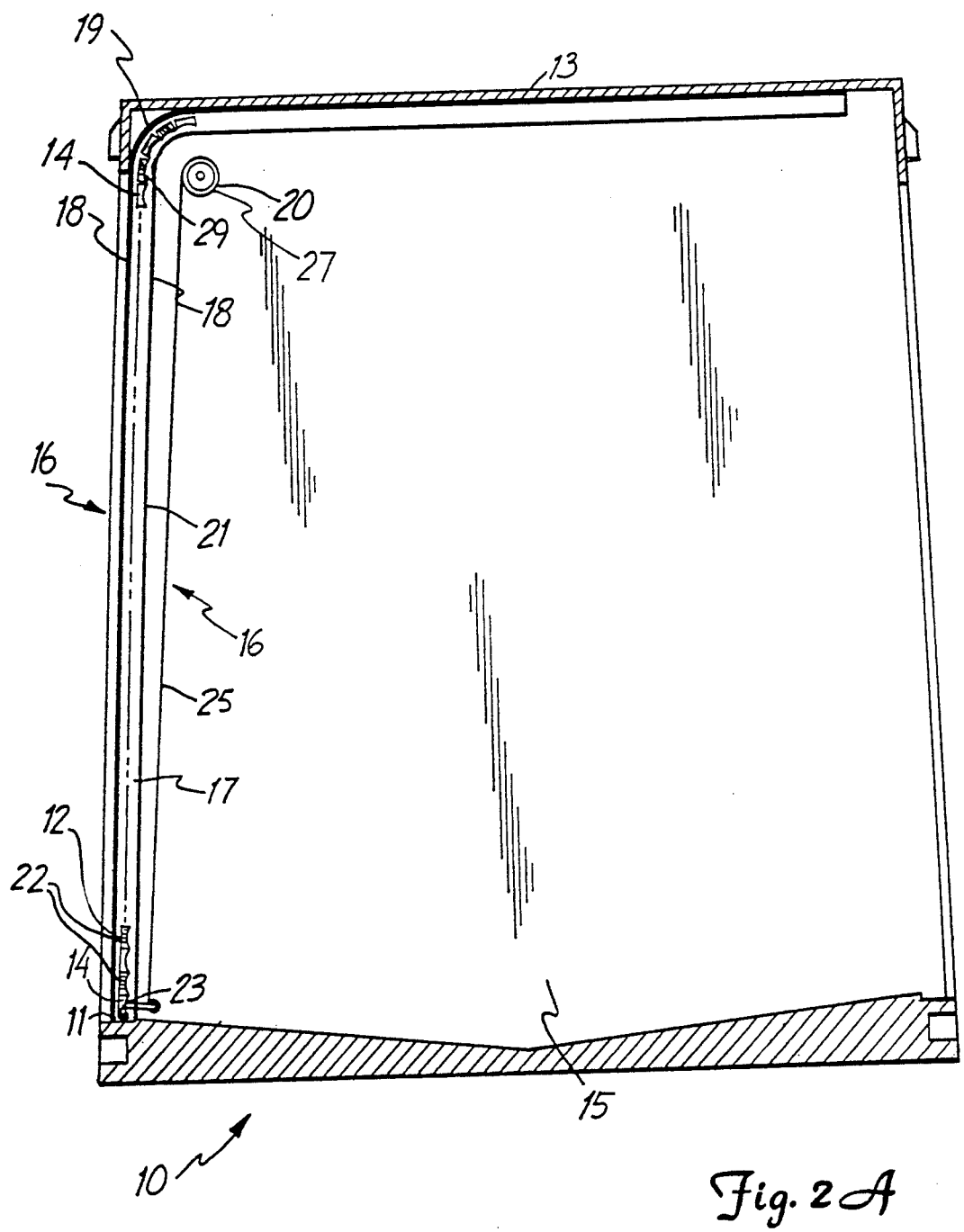
FIG. 2A is a transverse sectional view taken along line 2A—2A of FIG. 1 showing two articulated doors installed in a beverage body.

The present invention is an articulated door and door guiding track for use in beverage bodies. The articulated door is formed from a plurality of polymeric panel sections and is guided between an open position and a closed position by a door guiding track.

FIG. 1 is a perspective view of beverage body 10. Beverage body 10 has floor 11, roof 13, walls 9, and a plurality of door openings between floor 11 and roof 13 in which articulated doors 12 are positioned. Beverage body 10 has an exterior and an interior. The interior is divided into individual beverage storage bays that are accessible by articulated doors 12. Articulated doors 12 are formed by engaging polymeric panel sections 14 into a sequence. A typical door of this type is 87 inches tall and 54 inches wide.

FIG. 2A is a transverse sectional view taken along line 2A—2A of FIG. 1 showing an articulated door 12 installed in beverage body 10. Articulated door 12 provides access to beverage storage bay 15 and is formed by engaging panel sections 14 into a sequence (this view does not show every panel section 14 required to form articulated door 12). Every alternate panel section 14 is provided with a pair of slider plugs 22. A bottom panel section 14, located adjacent to floor of beverage body 10 when articulated door 12 is in the closed position, contains seal 23.

Articulated door 12 is supported and guided by door guiding track 16. Door guiding track 16 is comprised of a pair of channels 21, which face each other across the door opening. In this figure, only one channel 21 of door guiding track 16 is visible. Each channel 21 includes channel members 18, which face each other across gap space 17, and curved segment 19, which is provided to guide articulated door 12 above beverage storage bay 15 and along roof 13 when door 12 is moved to the opened position.

Articulated door 12 is connected to counter-balance 20 to assist a delivery person in moving articulated door 12 between the open position and the closed position. Counter-balance 20 includes strap 25, spring loaded drum 27, and guide bar 29. Strap 25 is connected between the bottom of door 12 and the spring-loaded drum 27.

Figure 2B:
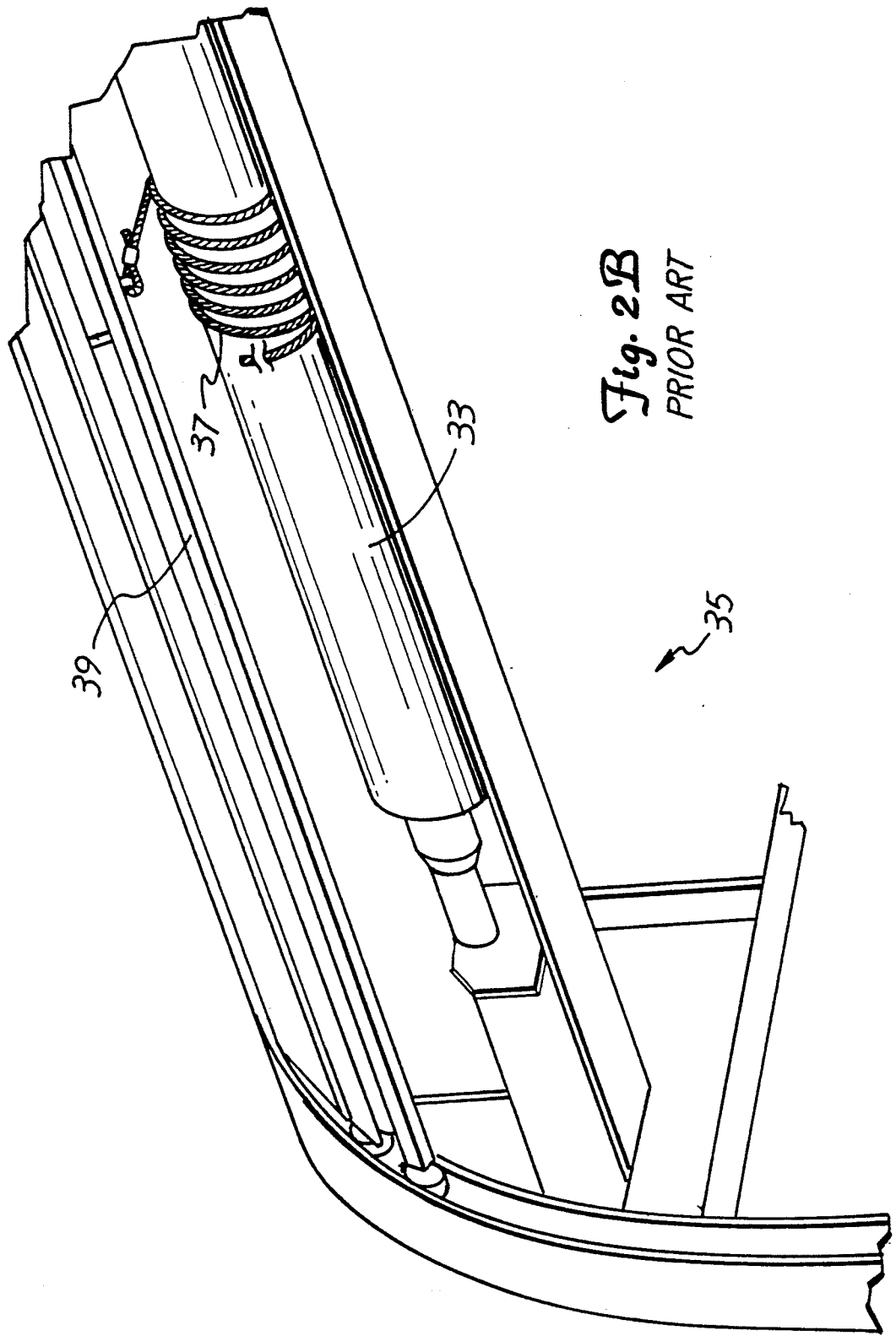
FIG. 2B is a perspective view of a counter-balance device of the prior art.

FIG. 2B is a perspective view showing a counter-balance of the prior art. The counter-balance device is comprised of spring-loaded drum 33 and cable 37. Spring loaded drum 33 is rotatably mounted to truck body 35, and cable 37 has one end connected to the center of drum 33 and another end connected to door 39.

As door 39 is initially lifted from the closed position, the counter-balance pulls door 39 straight up. However, as door 39 continues to move toward the open position, cable 37 tends to move toward one side of the door opening as it wraps around drum 33, thereby applying an asymmetric force to door 39. This asymmetric force causes door 39 to wear excessively at two locations, the top corner of door 39 adjacent the side toward which cable 37 is moving and the bottom corner of door 39 adjacent the side opposite the side toward which cable 37 is moving.

Figure 2C:
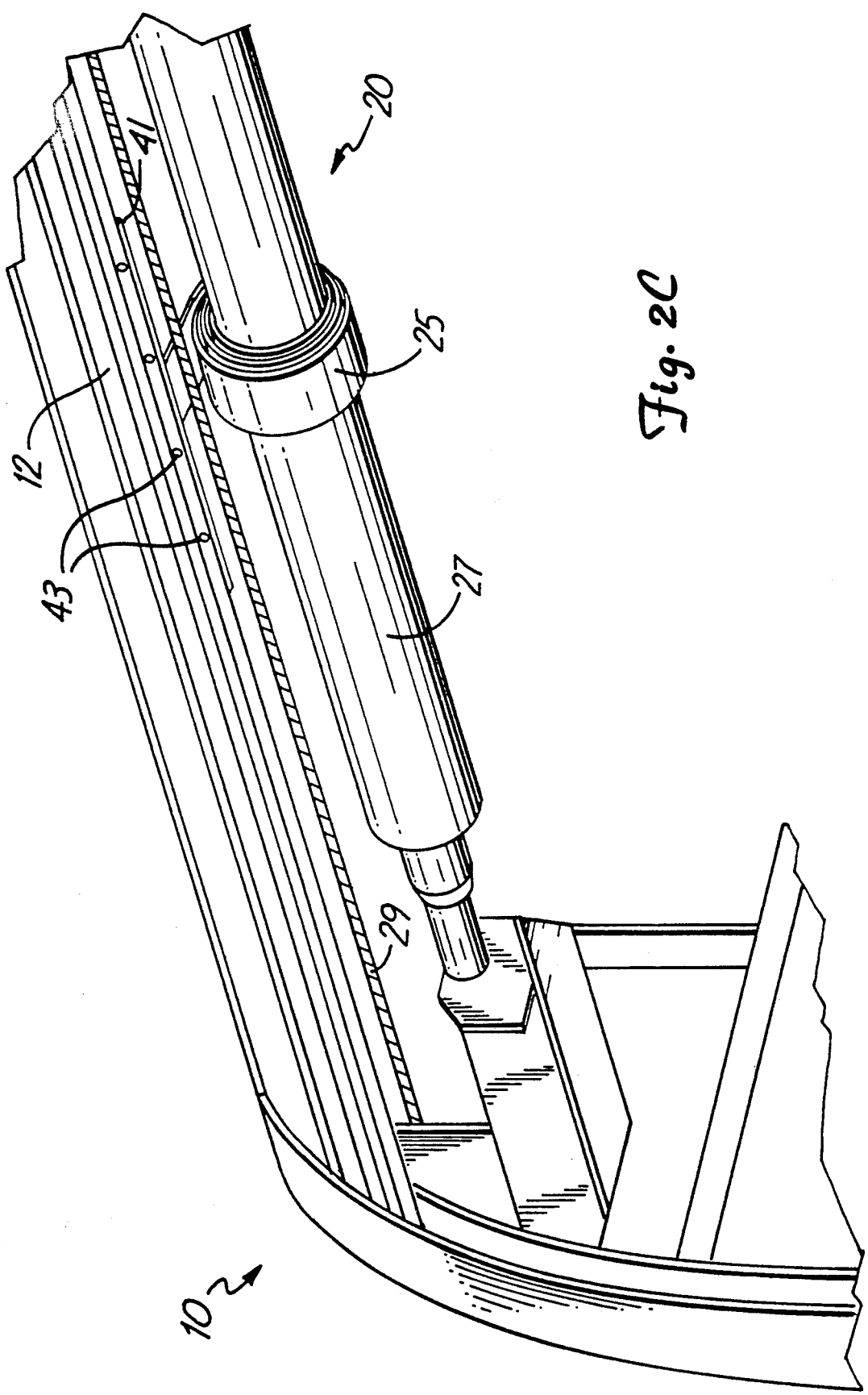
FIG. 2C is a perspective view of the counter-balance which is part of the present invention and is shown in FIG. 2A.

FIG. 2C is a perspective view showing counter-balance 20 of FIG. 2A. Counter-balance 20 includes spring loaded drum 27, strap 25, guide bar 29, and mounting bar 41. Drum 27 is rotatably connected to beverage body 10. Strap 25 has one end attached to the center of drum 27 and another end attached to mounting bar 41. Strap 25 may be mounted to mounting bar 41 in two locations, such that a loop is formed for pulling the door down. Mounting bar 41 is attached to the bottom of articulated door 12 by rivets 43.

As beverage door 12 travels from the closed position to the open position, strap 25 rolls up upon itself. Strap 25 always pulls door 12 straight up, thereby eliminating the excessive wear caused by counter-balance devices of the prior art. Guide bar 29 encourages strap 25 to roll up upon itself by stabilizing strap 25 and keeping it flat.

In one preferred embodiment, strap 25 is made the same material from which seat belts are generally made. Typically, seat belts are made from a two-inch webbing material that is woven from nylon, polyester, or a combination thereof. This material is manufactured to meet very high standards for strength and durability. A seat belt must be able to withstand being wound and unwound many times a day, and yet be able to restrain a person in a car accident years after the material was manufactured. For this reason, seat belt webbing is an ideal material from which to construct strap 25.

Strap 25 must be sufficiently wide to roll up upon itself. If the strap is too narrow, it will tend to slip off to one side as drum 27 rotates, thereby tending to create an asymmetric force as in counter-balances of the prior art. A strap that is two inches wide has been found to be sufficient for most beverage body applications. It is believed that the strap could be as narrow as one-half an inch and still perform adequately. Of course a wider strap would also perform adequately.

Two other factors relevant in determining the width of the strap are its length and thickness. As the strap gets longer, presumably to match a longer articulated door, the diameter of the wound strap on drum 27 becomes greater. As the diameter of the wound strap on drum 27 becomes greater, it is more likely that the strap will slip off to one side. Accordingly, as the length of the strap becomes longer, the strap may also have to become wider. Likewise, the thickness of the strap material also affects the diameter of the wound strap on drum 27. If thicker material is chosen for strap 25, strap 25 may have to be wider. Strap 25 must also be long enough so that some of the strap remains wound around drum 27 when door 12 is completely closed. This allows the strap to properly begin rolling up upon itself when the door is opened.

Figure 2D:
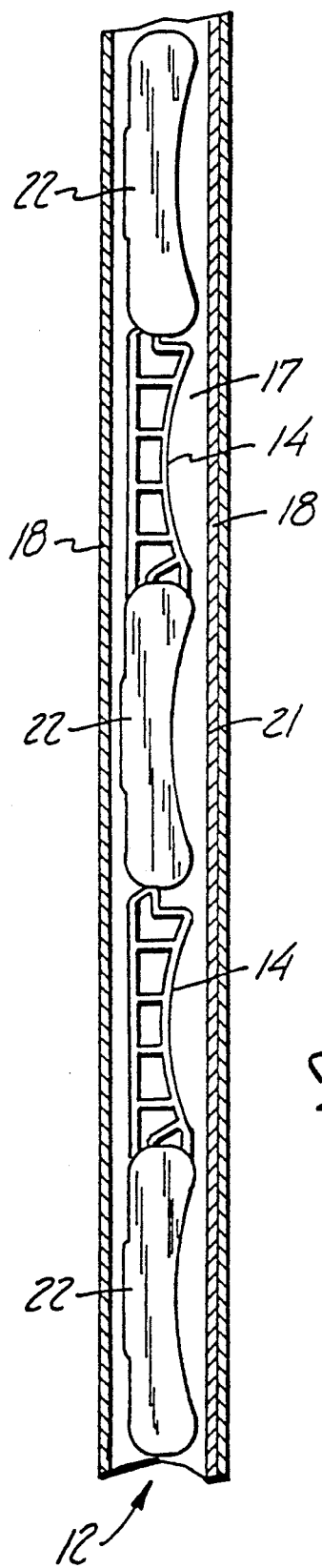
FIG. 2D is a sectional view of a section of an articulated door taken along line 2D—2D of FIG. 1.

FIG. 2D is an enlarged view of a section of the left articulated door 12 of FIG. 2A. Every alternate panel section 14 is provided with a slider plug 22. Because slider plug 22 is wider than panel section 14, articulated door 12 is supported and guided by a contact between channel members 18 and slider plugs 22. The height of slider plug 22 is larger than the height of panel section 14. This allows slider plug 22 to partially cover the hinge between adjacent panel sections. This holds articulated door 12 together by preventing adjoining panel sections from sliding apart.

FIG. 3A is a perspective view of polymeric panel section 14. When a plurality of panel sections 14 are engaged in a sequence, they form articulated door 12 of FIG. 1. Panel section 14 has curved inner surface 24 and flat outer surface 26. Curved inner surface 24 has a preferred radius of 2.099 inches. This facilitates the movement of articulated door 12 through the curved section 19 of door guiding track 16 of FIG. 2A. Flat outer surface 26 is provided so that articulated door 12 can be easily painted with a beverage company's logo using a process such as silk-screening. Curved inner surface 24 and flat outer surface 26 are connected to each other by a plurality of parallel partitions 28. Plurality of parallel partitions 28 divides a space between flat outer surface 26 and curved inner surface 24 into a plurality of parallel compartments 30. This increases the strength and insulation properties of panel section 14 while decreasing the weight of the panel section.

An articulated door formed from a plurality of panel sections 14 will have an insulation value approximately twice that of an insulated aluminum door of the prior art. Therefore, for most applications, the articulated door of the present invention will not require any additional insulation. However, if a beverage body is to be used in extremely cold climates, or an articulated door is to be used in an application where a high insulation value is crucial, panel section 14 can be easily and inexpensively provided with insulation. FIG. 3B is a transverse sectional view taken along line 3B—3B of FIG. 3A. In an alternative embodiment shown in FIG. 3B, the plurality of parallel compartments 30 of panel section 14 are filled with urethane foam insulation 31. This greatly enhances the insulation value of panel section 14 without changing the external dimensions of the panel section or an articulated door constructed therefrom.

In FIG. 3A, panel section 14 has right end 32 and left end 34 (named with respect to viewing a panel section 14 in an articulated door 12 from an exterior of beverage body 10 of FIG. 1). Right end 32 and left end 34 expose the plurality of parallel compartments 30. Panel section 14 also includes top hook edge 36 and bottom receptive edge 38, which engage with adjoining panel sections 14 to form articulated door 12 of FIG. 1. Ideally, a distance between top hook edge 36 and bottom receptive edge 38, i.e., the height of panel section 14, is as large as possible. As this distance becomes larger, fewer panel sections 14 are required to form articulated door 12, thereby decreasing the cost of the door. However, as the height of the panel sections increases, so must the radius of curved section 19 of door guiding track 16 of FIG. 2A. Therefore, the preferred height of panel section 14 is 2.430 inches to facilitate an articulated door 12 formed from an acceptable number of panel sections 14 while maintaining an acceptable radius for curved section 19 of door guiding track 16.

Panel section 14 is formed by an extrusion process using a material that is a polymer blend of polyphenylene oxide and high impact polystyrene with triarylphosphate esters added to retard fire. Different variants of the polymer blend can be used based on the climate where the articulated door will be used. Compared to aluminum, the polymer blend used in the present invention has a high insulation value and is lightweight, resilient, self-lubricating, wear resistant, and corrosion resistant. Parallel partitions 28, curved inner surface 24, flat outer surface 26, top hook edge 36, bottom receptive edge 38, and other extruded walls are formed with a thickness of 0.05 inches.

FIG. 4A is a side view of a pair of adjacent engaged panel sections 14 that form a segment of the articulated door 12 of FIG. 1. The two panel sections 14 are shown positioned with respect to each other as they would be when the door is in the closed position. Top hook edge 36 is engaged with bottom receptive edge 38 to form hinge 40, with top hook edge 36 positioned generally within bottom receptive edge 38. Hinge 40 allows the pair of adjacent engaged panel sections 14 to be positioned at varying angles with respect to each other.

FIG. 4B is a side view similar to FIG. 4A, with the adjacent panel sections 14 positioned at an angle with respect to each other. Two adjacent panel sections 14 would be positioned in such a way as they move through curved section 19 of door guiding track 16 of FIG. 2A.

FIG. 5 is a fragmentary perspective view of a bottom panel section 14 that is located at a bottom end of articulated door 12. When articulated door 12 is in the closed position, as shown in FIG. 1, bottom panel section 14 is located adjacent to floor 11 of beverage body 10. Bottom panel section 14 has seal 23 inserted in bottom receptive edge 38. Seal 23 seals a gap between floor 11 of beverage body 10 and the bottom end of articulated door 12 when door 12 is in the closed position.

Also shown in FIG. 5 (removed from right end 32 of panel section 14) is slider plug 22. Slider plug 22 is formed from a low density ultra-high molecular weight polyethylene plastic and is comprised of end plate 46 and plurality of fingers 48. Each finger 48 has a plurality of deflectable retention tabs 50 positioned perpendicularly to finger 48 and parallel with the end plate 46. Slider plug 22 also includes outer surface plate 52 which extends perpendicularly from end plate 46 and is parallel with the plurality of fingers 48.

The sequence of panel sections 14 that forms articulated door 12 alternates between a first panel section and a second panel section. A slider plug 22 is positioned on right end 32 and left end 34 (shown in FIG. 3A) of every first panel section in the sequence. In other words, a pair of slider plugs 22 is provided for every alternate panel section 14 in the sequence of panel sections that forms articulated door 12. Slider plug 22 is attached to an end of panel section 14 by having each of the plurality of fingers 48 of slider plug 22 placed in a parallel compartment 30, with the plurality of deflectable retention tabs 50 of each finger 48 in contact with an interior surface of the corresponding parallel compartment 30 and outer surface plate 52 extending out over flat outer surface 26 of panel section 14.

End plate 46 is large enough to partially cover top hook edge 36 and bottom receptive edge 38. This holds the articulated door together by preventing two adjacent engaged panel sections from sliding apart from each other. In the case of the bottom panel section 14 shown in FIG. 5, end plate 46 also prevents seal 23 from sliding out of bottom receptive edge 38.

Figure 6A:
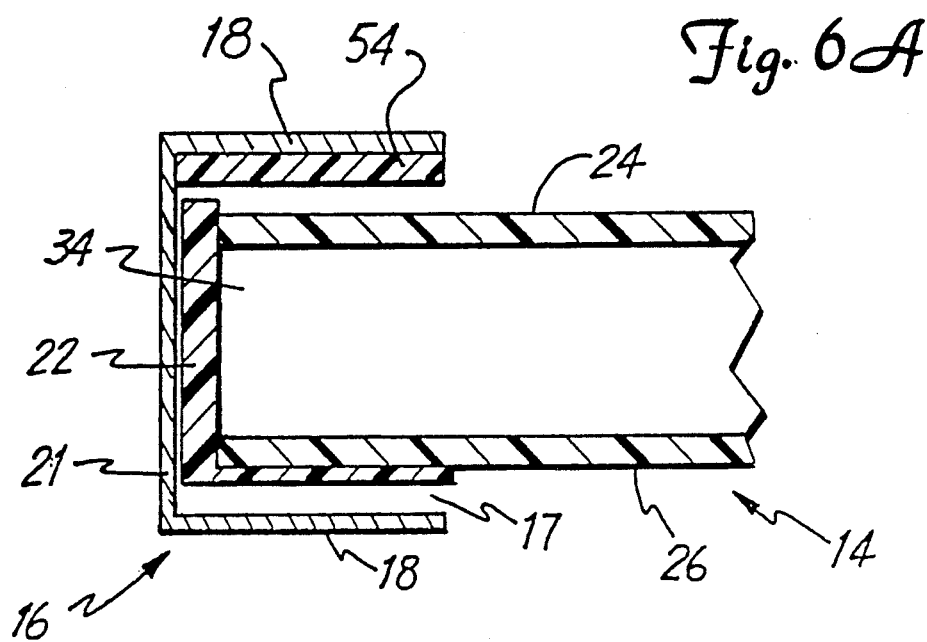
FIGS. 6A and 6B are top cutaway views taken along lines 6A—6A and 6B—6B, respectively of FIG. 1 showing panel sections inserted into door guiding tracks.

FIG. 6A is a fragmentary cutaway view showing panel section 14 and door guiding track 16 taken along line 6—6 of FIG. 1. Door guiding track 16 includes a pair of channels 21, one of which is shown in this figure. Channel 21 includes channel members 18 facing each other across gap space 17. Panel section 14 has slider plug 22 inserted into left end 34. The distance between curved inner surface 24 and flat outer surface 26, i.e., the width of panel section 14, is preferably 0.515 inches, while the preferred width of slider plug 22 is 0.575 inches. Because slider plug 22 is wider than panel section 14, panel section 14 is not in direct contact with door guiding track 16.

In this embodiment, track liner 54 is positioned over a channel member 18 that faces curved inner surface 24 of panel section 14. Track liner 54 is formed from a high density ultra-high molecular weight polyethylene plastic. This produces a sliding, self-lubricating, plastic-on-plastic contact between slider plug 22 and track liner 54. This embodiment is used in door guiding tracks that have been converted to the present invention from door guiding tracks of the prior art.

Figure 6B:
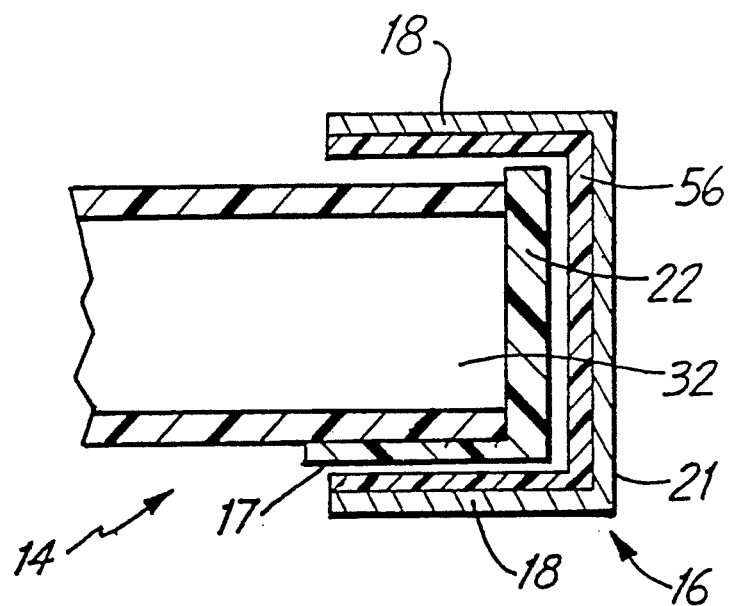

FIG. 6B is also a fragmentary cutaway view showing panel section 14 and door guiding track 16 taken along line 6—6 of FIG. 1. Right end 32 is positioned in gap space 17 of channel 21. In this embodiment, a three sided integrally formed track liner 56 is placed in channel 21. Track liner 56 is formed from a high density ultra-high molecular weight polyethylene plastic. This produces a sliding, self-lubricating, plastic-on-plastic contact between slider plug 22 and track liner 56. This embodiment is used in door guiding track of new construction.

The present invention improves the operation of articulated doors and door guiding tracks in beverage bodies by eliminating the rollers required in the prior art. The rollers are replaced by a sliding, self-lubricating, plastic-on-plastic contact that supports and guides the articulated door as it is moved between the open position and the closed position, thereby making the door less sensitive to door frame misalignment.

The articulated door of the present invention will last longer than articulated aluminum doors of the prior art. The plastic-on-plastic contact in the hinges that connect adjacent panel sections can outwear the aluminum-on-aluminum contact in the hinges of the prior art by a factor of approximately 6 to 1. Although both plastic and aluminum can be steam cleaned, any salt, sand, or dirt that gets into an aluminum hinge will take a toll in wear and corrosion before it can be removed. In contrast, when a plastic hinge is steam cleaned and the salt, sand, and dirt are removed, the underlying plastic surfaces of the hinge are left largely unaffected because the plastic used in the present invention is highly corrosion resistant and wear resistant.

The articulated door of the present invention weighs less the one-half the weight of articulated aluminum doors of the prior art. This results in a weight reduction of more than 500 pounds in a typical beverage body.

Compared to aluminum, which is highly thermo-conductive, the plastic used to form the articulated door of the present invention has a very high insulation value. While an articulated aluminum door of the prior art will require a layer of insulation to be attached for use in cold climates, the articulated door of the present invention probably will not require additional insulation. However, if additional insulation is required, foam insulation can be placed inside the plurality of compartments of the panel sections to increase the insulation value of the door.

The articulated door of the present invention is resilient; articulated aluminum doors of the prior art are not. The door is much less likely to be damaged from impacts and collisions than are aluminum doors of the prior art. If the door is impacted, the panel sections probably will not break, but instead may pop out of the door guiding track and the hinges that connect the panel sections to adjacent panel sections. Most likely the panel sections will not be damaged and the door can be reassembled.

Finally, the articulated door of the present invention is provided with a counter-balance that eliminates much of the wear associated with counter-balance devices of the prior art.

Although the present invention has been described with reference to preferred embodiments, workers skilled in the art will recognize that changes may be made in form and detail without departing from the spirit and scope of the invention.

What is claimed is:

1. A counter-balance in combination with an articulated door, the combination comprising:
   a wall;
   a door opening in the wall, the door opening having a top, a left side, and a right side;
   a left door guiding track positioned along the left side of the door opening;
   a right door guiding track positioned along the right side of the door opening;
   an articulated door having a bottom edge, a left edge movably positioned in the left door guiding track, and a right edge movably positioned in the right door guiding track;
   mounting means for mounting the counter-balance proximate the top of the door opening;
   a drum rotatably coupled to the mounting means, the drum having a center positioned between the right and left sides of the door opening;
   a strap having a first end attached to the center of the drum and a second end attached proximate the bottom edge of the door in a position which allows the door to be pulled straight up by the drum, wherein the strap is of sufficient width to enable the strap to roll up upon itself as the drum rotates.

2. The combination of claim 1 wherein the strap is comprised of seat-belt webbing.

3. The combination of claim 1 wherein the strap is comprised of nylon.

4. The combination of claim 1 wherein the strap is comprised of polyester.

5. The combination of claim 1 wherein the strap is approximately two inches wide.

6. A truck body comprising:
   a floor;
   a roof;
   a plurality of exterior walls intermediate to the floor and the roof;
   a door opening in one of the exterior walls, the door opening having a top, a left side, and a right side;
   a left channel having a section positioned along the left side of the door opening connected by a curved section to a section positioned along the roof;
   a right channel having a section positioned along the right side of the door opening connected by a curved section to a section positioned along the roof, wherein the left channel and the right channel form a door guiding track;
   an articulated door slidably positioned in the door guiding track, movable between an open position and a closed position and having a bottom edge, the articulated door comprising:
      a plurality of panel sections connected together such that a hinge is formed between adjacent panel sections, the hinge allowing the adjacent panel sections to be positioned at varying angles with respect to each other, each panel section having a left end extending into and guided by the left channel and a right end extending into and guided by the right channel; and
   a counter-balance comprising:
      mounting means for mounting the counter-balance proximate the top of the door opening;
      a drum rotatably coupled to the mounting mean, the drum having a center positioned between the right and left sides of the door opening; and
      a strap having a first end attached to the center of the drum and a second end attached proximate the bottom edge of the articulated door in a position which allows the door to be pulled straight up by the drum, wherein the strap is of sufficient width to enable the strap to roll up upon itself as the door is moved from the closed position to the open position.

7. The truck body of claim 6 wherein each panel section comprises:
   an outer surface;
   an inner surface;
   a plurality of partitions connecting the outer surface to the inner surface and separating a space between the outer surface and the inner surface into a plurality of compartments;
   a bottom receptive edge adjacent to the outer surface and the inner surface and connecting the left end to the right end; and
   a top hook edge positioned opposite the bottom receptive edge, adjacent to the outer surface and the inner surface and connecting the left end to the right end, for engaging the bottom receptive edge of a like panel section by being generally positioned within the bottom receptive edge of the like panel section to form the hinge between the adjacent panel sections.

8. The truck body of claim 7 and further including a seal wherein a part of the seal is positioned within and retained by the bottom receptive edge of a last panel section of the plurality of panel sections that does not have the bottom receptive edge thereof engaged with another panel section, and a remainder of the seal extends out from the bottom receptive edge of the last panel section, thereby sealing a gap between the bottom edge of the articulated door and the floor of the truck body when the articulated door in the closed position.

9. The truck body of claim 6 and further including a plurality of pairs of polymeric slider plugs wherein each pair of slider plugs is attached to one of the plurality of panel sections, with a first slider plug of the pair attached to the left end of the one panel section, and a second slider plug of the pair attached to the right end of the one panel section.

10. The truck body of claim 9 wherein the plurality of panel sections are connected in a sequence which alternates between a first panel section and a second panel section, and one of the pair of the slider plugs is provided for every first panel section in the sequence.

11. An articulated door system comprising:
    a door guiding track formed by a left channel, part of which is positioned along a left side of a door opening, and a right channel, part of which is positioned along a right side of the door opening;
    an articulated door slidably positioned in the door guiding track and movable between an open position and a closed position and having a bottom edge, the articulated door comprising:
       a plurality of panel sections connected together in an alternating sequence of first and second panel sections such that a hinge is formed between each first panel section and each second panel section, the hinge allowing each first panel section to be positioned at varying angles with respect to each second panel section; and a counter-balance comprised of:

mounting means for mounting the counter-balance proximate a top of the door opening;

a drum rotatably coupled to the mounting means, the drum having a center positioned between the right and left channels; and a strap having a first end attached to the center of the drum and a second end attached proximate the bottom edge of the articulated door in a position which allows the door to be pulled straight up by the drum, wherein the strap has sufficient width to enable the strap to roll up upon itself as the articulated door is moved from the closed position to the open position.

12. The articulated door system of claim 11 wherein each panel section comprises:

an outer surface;

an inner surface;

a plurality of partitions connecting the outer surface to the inner surface and separating a space between the outer surface and the inner surface into a plurality of compartments;

a top hook edge positioned adjacent to the outer surface and the inner surface; and a bottom receptive edge positioned opposite the top hook edge and adjacent to the outer surface and the inner surface, for engaging the top hook edge of a like panel section by having the top hook edge of the like panel section being generally positioned within the bottom receptive edge to form the hinge between adjacent panel sections.

* * * * *

UNITED STATES PATENT AND TRADEMARK OFFICE
CERTIFICATE OF CORRECTION

PATENT NO. : 5,184,864

DATED : February 9, 1993

INVENTOR(S) : JERRY T. TEIGEN, PAUL A. VILLELLA

It is certified that error appears in the above-identified patent and that said Letters Patent is hereby corrected as shown below:

Col. 10, line 6, delete "mean," insert --means,--

Col. 10, line 45, after "door", insert --is--

Signed and Sealed this

Sixteenth Day of November, 1993

Attest:

BRUCE LEHMAN

*Attesting Officer*   Commissioner of Patents and Trademarks